United States Patent [19]

Chikaraishi

[11] 4,433,507
[45] Feb. 28, 1984

[54] STRUCTURE FOR PREVENTING VERTICAL MOVEMENT OF A SLIDING DOOR

[75] Inventor: Takayo Chikaraishi, Kawasaki, Japan

[73] Assignee: Nissan Motor Company, Limited, Kanagawa, Japan

[21] Appl. No.: 286,183

[22] Filed: Jul. 22, 1981

[30] Foreign Application Priority Data

Jul. 26, 1980 [JP] Japan .................. 55-102662

[51] Int. Cl.³ ............................ E05D 15/10
[52] U.S. Cl. ...................... 49/213; 49/410; 16/91
[58] Field of Search ............ 49/410, 411, 427, 213, 49/214, 215; 16/90, 91

[56] References Cited

U.S. PATENT DOCUMENTS 1,621,802  3/1927  Morrison .
3,312,015  4/1967  Plegat ................... 49/213

FOREIGN PATENT DOCUMENTS 421173  11/1925  Fed. Rep. of Germany ........ 49/214
953029  3/1964  United Kingdom .
1160685  8/1969  United Kingdom .

*Primary Examiner*—Kenneth Downey
*Attorney, Agent, or Firm*—Lowe, King, Price & Becker

[57] ABSTRACT

A structure for preventing a sliding door from moving vertically, comprises the sliding door having an inner and an outer panels, a vehice body, a guide rail fixed to the vehicle body in such a manner that the sliding door can be guided by the guide rail when the sliding door is opened and closed, the guide rail being inwardly curved at the front end portion thereof, a bracket fixed to the inner panel of the sliding door, a roller attached to the bracket, the roller engaging the guide rail, a locking element having a tapered surface sloping in a lateral direction of the vehicle body, the locking element being attached to the bracket in such a way that, when the sliding door is closed, the tapered surface of the locking element engages a portion fixed relative to the vehicle body thereby to prevent the sliding door from moving vertically.

10 Claims, 6 Drawing Figures

FIG. I (PRIOR ART)
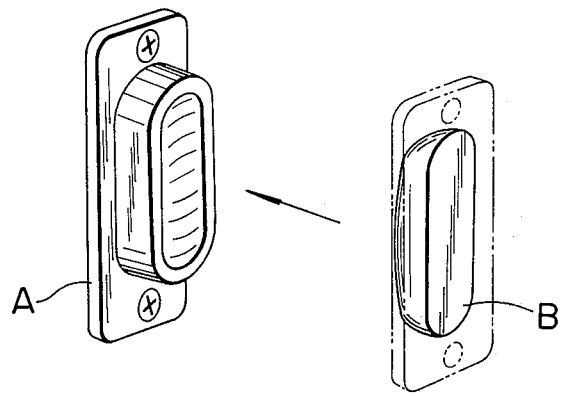
FIG. 2
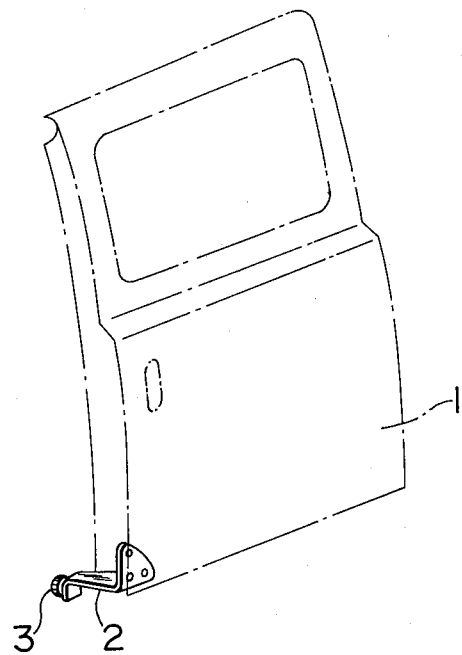

STRUCTURE FOR PREVENTING VERTICAL MOVEMENT OF A SLIDING DOOR

BACKGROUND OF THE INVENTION

The present invention relates to a structure for preventing vertical movement of an automotive vehicle sliding door.

In a van type automotive vehicle equipped with a sliding door, the sliding door must be held in position by suitable means preventing vertical movement thereof during driving.

FIG. 1 shows a conventional structure for preventing such a sliding door from moving vertically during driving. A locking device is provided at a rear portion of the door to locking the door in a vertical direction. Also, at a front portion of the door, as shown in FIG. 1, a pair of engaging members A, B are arranged between the vehicle body and the door. Engaging member A is fixed to a side of the door while engaging member B is fixed to a center pillar of the vehicle body. When the door is closed, engaging member B engages vertical movement of member A so that the door is prevented.

To achieve the aforesaid engagement, after door assembly positions of the engaging members A, B must be precisely adjusted. Even if properly adjusted, the relative positions of the members may change as a result of driving.

SUMMARY OF THE INVENTION

An object of the present invention is to provide a structure of preventing a sliding door for an automotive vehicle from moving vertically without requiring adjustment of locking points of the sliding door after it is assembled in position.

A further object of the present invention is to provide a structure for preventing a sliding door for an automotive vehicle from moving vertically without requiring adjustment of the locking positions of the sliding door even if it shifts slightly during driving.

BRIEF DESCRIPTION OF THE DRAWINGS

FIG. 1 is a schematic perspective view showing a conventional structure for preventing a sliding door from moving vertically;

FIG. 2 is a schematic perspective view showing a sliding door equipped with a structure for preventing it from moving vertically according to a preferred embodiment of the present invention;

DETAILED DESCRIPTION OF THE PREFERRED EMBODIMENT

Figure 3:
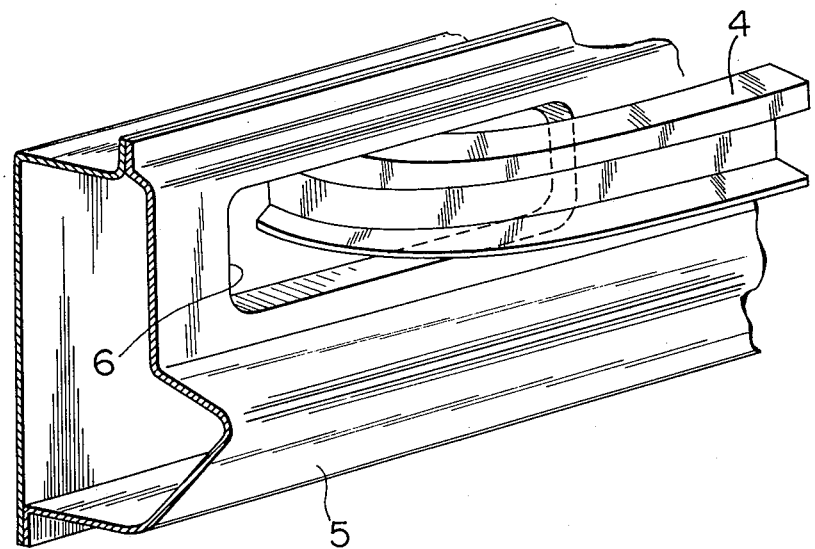
FIG. 3 is a perspective view showing a front end portion of a guide rail for use in the structure as shown in FIG. 2.

Referring now to FIGS. 2 to 5, a sliding door 1 is affixed to an automotive vehicle body (not shown). A bracket 2 is attached to a lower end portion of the front side of door 1. A roller 3 is attached to the inner end of bracket 2. Roller 3 engages a lower guide rail 4 and an upper guide rail (not shown). The front end portion of guide rail 4 is curved toward the inner part of the vehicle body as shown in FIG. 3. When sliding door 1 is closed, the outer surface of the door enters into alignment with the outer surface of the body. When sliding door 1 is opened, the outer surface of the door slightly shifts outwardly from the body.

Guide rail 4 is fixed along the outer surface of sill outer panel 5 and is curved at the front end portion to pass into the sill through a rectangular opening 6.

In the illustrated embodiment, bracket 2 is formed from a plate-like member having its inner end bent downwardly while its other end is upwardly bent. Roller 3 is attached onto the inner end of bracket 2. The other end of bracket 2 is fixed to inner panel 1a of sliding door 1 at a lower end portion thereof by bolts.

Figure 4:
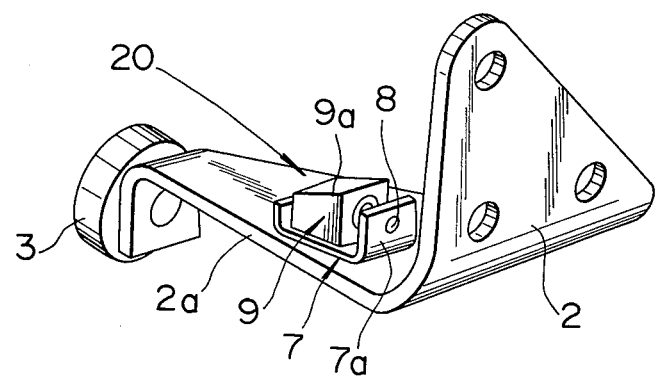
FIG. 4 is a perspective view showing an essential portion of the structure as shown in FIG. 2.

As illustrated in FIG. 4, a locking device 20 is arranged on the bracket 2. Device 20 includes channel shaped fitting member 7 having a pair of bent portions or legs 7a. Member 7 is fixed to the upperside of horizontally extending portion 2a of the bracket 2 so that legs 7a project upwardly. A pin 8 is attached to fitting member 7 in a direction parallel with the shaft supporting roller 3, that is, in a direction perpendicular to the outer surface of the body. A locking element 9 is slidably retained on pin 8. Locking element 9 may be made of resin material and has a tapered surface 9a which slopes downwardly toward roller 3.

Figure 5:
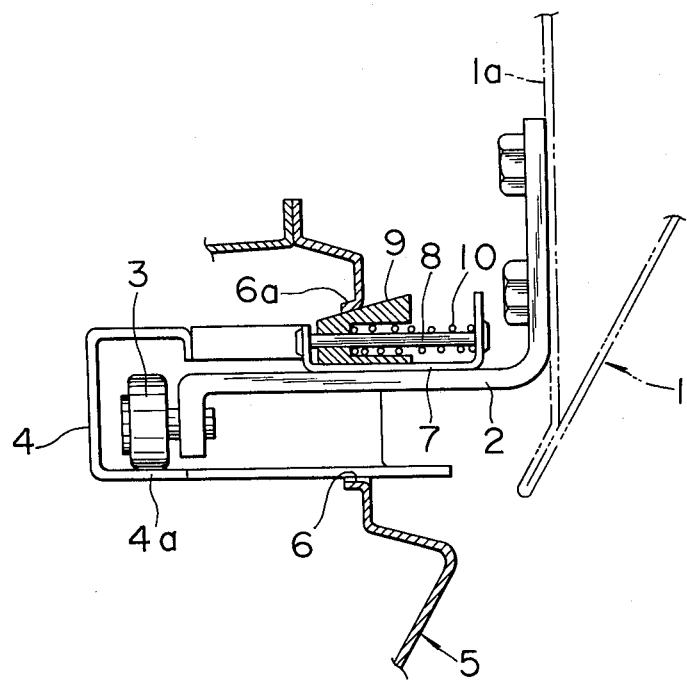
FIG. 5 shows a vertical section of the structure as shown in FIG. 2.

Locking element 9 moves slidably along pin 8 between legs 7a. Preferably, as illustrated in FIG. 5, a compressed coil spring 10 is disposed between locking element 9 and leg 7a to bias that the locking element toward roller 3.

In operation, when door 1 slides forwardly to be closed, roller 3 rides along guide rail 4. At the front end portion of guide rail 4, roller 3 moves into opening 6 of sill outer panel 5 along the curved portion of the guide rail. At that time, sliding door 1 shifts toward the center of the vehicle body while tapered surface 9a of locking element 9 contacts a portion 6a of sill outer panel 5 formed at the upper edge of opening 6 in the sill outer panel. Thus, locking element 9 is pressed downwardly by means of portion 6a, causing roller 3 to be pressed against the lower portion 4a of guide rail 4. In this manner downward vertical movement of sliding door 1 is prevented due to engagement between roller 3 and portion 4a while upward movement of the sliding door 1 is being prevented due to locking element 9 abutting against portion 6a.

Even if sliding door 1 were to shift slightly, tapered surface 9a engaging portion 6a effectively prevents the door from moving vertically.

Since locking element 9 is always biased by coil spring 10 toward roller 3, if a gap is formed between the locking element and sill outer panel 5 during driving, the locking element is biased by the force of the spring to contact portion 6a.

Figure 6:
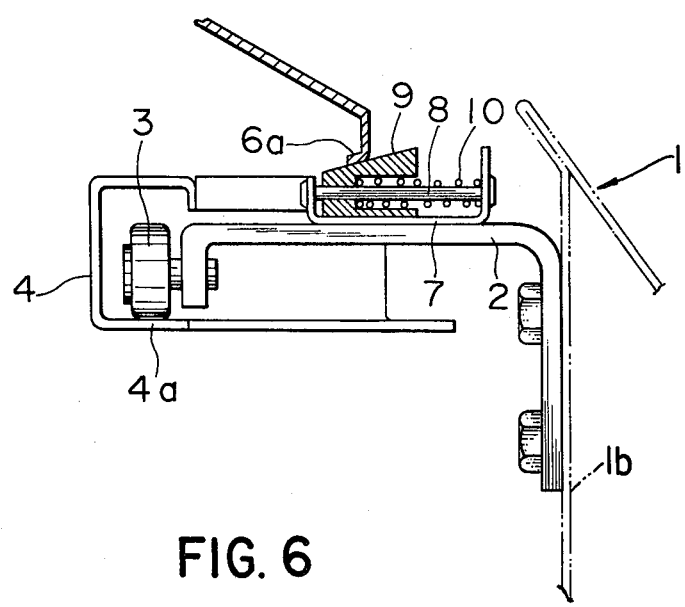
FIG. 6 shows a vertical section of the invention contacting a portion of the roof side panel.

Although a preferred embodiment of the present invention has been shown and described, the present invention is not limited thereto. For example, as shown in FIG. 6, a locking device 9 can be provided at an upper portion 1b of sliding door 1. A bracket 2 can be attached to an upper end portion 1b of the inner panel 1a of the sliding door 1 in such a manner that a roller engages an upper guide rail 4'. A locking element can contact a portion of a roof side panel 6a' so that a sliding door can be prevented from moving vertically.

According to the present invention, a sliding door can be prevented from moving vertically by means of engagement of the locking element with a portion of a sill outer panel, roof side panel or the like. During driving, vibration of the sliding door can be avoided. Even if a predetermined position of the sliding door shifts after its original setting, it is not required to adjust it because the locking element can surely engage a portion fixed relative to the vehicle.

The present invention can be applied to a vehicle equipped with a sliding door, having no center pillar because a bracket can be fixed to an upper end portion or lower end portion of the sliding door.

What is claimed is:

1. A structure for preventing a sliding door having inner and outer panels from moving vertically, said door being connected to a vehicle body, comprising:
a guide rail affixed to the vehicle body, said guide rail being inwardly curved at a front end portion thereof;
a bracket affixed to the inner panel of the sliding door;
a roller attached to the bracket, said roller engaging the guide rail to enable the door to slide therealong between opening and closing positions; and
a locking element having a tapered surface sloping in a lateral direction of the vehicle body, said locking element being attached to the bracket to enable the tapered surface thereof to engage a fixed portion of the vehicle body when the sliding door is closed to thereby prevent the sliding door from moving vertically.

2. The structure of claim 1, further comprising a fitting member having a horizontally extending portion and a pair of legs respectively formed at opposite ends thereof, said locking element between said pair of legs, enabling the locking element to move therebetween.

3. The structure of claim 2, further comprising a spring disposed between one of the legs and the locking element to bias the locking element toward the roller.

4. A structure for preventing a sliding door having inner and outer panels from moving vertically, said door being connected to a vehicle body, comprising:
a guide rail affixed to the vehicle body, said guide rail being inwardly curved at a front end portion thereof;
a bracket affixed to the inner panel of the sliding door;
a roller attached to the bracket, said roller engaging the guide raile to enable the door to slide therealong between opening and closing positions; and
a locking element having a tapered surface sloping in a lateral direction of the vehicle body and downwardly toward the roller, said locking element being attached to the bracket to enable the tapered surface thereof to engage a fixed portion of the vehicle body when the sliding door is closed to thereby prevent the sliding door from moving vertically.

5. The structure of claim 4, wherein the tapered surface of the locking element contacts a portion of a sill outer panel along which the guide rail is provided.

6. The structure of claim 5, wherein said sill outer panel includes an opening receiving the curved portion of the guide rail to enable the tapered surface of the locking element to be pressed against the upper edge of the opening of the sill outer panel when the sliding door is closed so that the roller is pressed downwardly into engagement with the guide rail.

7. The structure of claim 1, wherein the tapered surface of the locking element contacts a portion of a roof side panel, and said guide rail is an upper guide rail.

8. The structure of claim 1, wherein the guide rail is a lower guide rail.

9. The structure of claim 4, wherein the tapered surface of the locking element contacts a portion of a roof side panel, and the guide rail is an upper guide rail.

10. The structure of claim 1, wherein said bracket includes a tip portion projecting towards a portion of the guide rail engaging the roller, said roller being mounted to the tip portion, said tapered surface sloping downwardly towards the tip portion.

* * * * *